United States Patent [19]

Miyashita et al.

[11] Patent Number: 4,803,591
[45] Date of Patent: Feb. 7, 1989

[54] DIELECTRIC CERAMIC COMPOSITION FOR MULTILAYER CAPACITOR

[75] Inventors: Yasuo Miyashita, Chichibu; Masao Kashima, Yokoze, both of Japan

[73] Assignee: Mitsubishi Mining & Cement Company, Ltd., Japan

[21] Appl. No.: 8,688

[22] Filed: Jan. 30, 1987

Related U.S. Application Data

[63] Continuation-in-part of Ser. No. 697,201, Jan. 25, 1985, abandoned, which is a continuation-in-part of Ser. No. 451,930, Dec. 21, 1982, abandoned.

[30] Foreign Application Priority Data

Jul. 20, 1982 [JP] Japan .................................. 57-125138

[51] Int. Cl.⁴ .......................... H01G 4/12; C04B 35/46
[52] U.S. Cl. ...................................... 361/321; 501/138
[58] Field of Search ......................... 361/321; 501/138

[56] References Cited

U.S. PATENT DOCUMENTS

| Re. 29,484 | 11/1977 | Utsumi et al. | 501/138 |
| 3,041,189 | 6/1962 | Herbert | 501/138 |
| 4,283,753 | 8/1981 | Burn | 501/138 |
| 4,353,047 | 10/1982 | Noguchi et al. | 501/138 |

FOREIGN PATENT DOCUMENTS

| 52-4358 | 2/1977 | Japan | 501/138 |
| 56-155070 | 12/1981 | Japan | 501/138 |

*Primary Examiner*—Mark L. Bell
*Attorney, Agent, or Firm*—Wegner & Bretschneider

[57] ABSTRACT

A dielectric ceramic composition for multilayer ceramic capacitors is provided which consisting essentially of 94.70–99.39 mole % of barium titanate, 0.50–3.00 mole % of niobium pentoxide, 0.10–2.00 mole % of zinc oxide, and 0.01–0.30 mole % in terms of manganese dioxide.

3 Claims, 6 Drawing Sheets d = 20 μm

4,803,591

DIELECTRIC CERAMIC COMPOSITION FOR MULTILAYER CAPACITOR

This application is a continuation-in-part of Ser. No. 697,201, filed Jan. 25, 1985, which is a continuation-in-part application of Ser. No. 451,930, filed Dec. 21, 1982 both now abandoned.

BACKGROUND OF THE INVENTION

1. Field of the Invention

The present invention relates to a dielectric ceramic composition characterized by a high dielectric constant with decreased temperature dependency over a wide temperature range, an extremely small dissipation factor, easiness of fabrication into a ceramic, and little deterioration even under such a high electric field intensity as encountered in a multilayer ceramic capacitors.

2. Description of the Prior Art

For the composition of high dielectric constant of which variation with temperature is small, there has so far been used barium titanate incorporated with a bismuth compound such as bismuth stannate, bismuth titanate, or bismuth zirconate to decrease said variation. As ceramic capacitor small in size and large in capacitance are required in recent years, multilayer ceramic capacitors has become to be more widely used. However, bismuth-containing dielectric compositions for this purpose have the drawback of remarkable corrosion which occurs on internal electrodes comprising platinum or palladium. A bismuth compound having a high vapor pressure employed as a raw material for ceramic condensers makes it extremely difficult to provide fine structural ceramics due to the vaporization of the bismuth compound during the firing for producing the ceramics. Such being the case, none of dielectric ceramic compositions have dielectric constant of more the 2000 and satisfy the requirement for small size and large capacitance.

Utsumi et al (U.S. Pat. Re No. 29,484) disclosed a system composed of barium titanate and niobium pentoxide having a high dielectric constant less dependent on temperature and a small dissipation factor. However, a ceramic multilayer capacitor made from the composition will deteriorate remarkably its electrical properties. This is caused by a high electric field intensity resulting from a small gap between the electrodes in a multilayer ceramic capacitor as shown in FIG. 2.

After comprehensive studies to provide a ceramic composition that has a high dielectric constant and does not have the above-mentioned drawbacks, the inventors of the present application have found that the addition of niobium pentoxide, zinc oxide and manganese to barium titanate gives a high dielectric constant less dependent on temperature as well as a smaller dielectric dissipation factor of the barium titanate. The inventors have further found the significance of the particle diameter of barium titanate as the principal component affecting remarkably the electrical characteristics, and have completed the present invention.

The present invention is characterized by the presence of manganese dioxide and the specified particle diameter range of barium titanate, which lead to less deterioration of electrical dissipation factor under intense electric field conditions.

SUMMARY OF THE INVENTION

The primary object of the present invention is to provide a ceramic composition of high dielectric constant which satisfies the requirement for small size and large capacitance and does not have any of the drawbacks mentioned above.

Another object of this invention is to provide a ceramic composition of high dielectric constant, of which the dielectric constant varies little over a wide range of temperature.

A further object of this invention is to provide a ceramic composition having high dielectric constant as well as very low dissipation factor.

According to the present invention, there is provided a dielectric ceramic composition for multilayer ceramic capacitors essentially consisting of 94.70–99.39 mole % of barium titanate, 0.50–3.00 mole % of niobium pentoxide, 0.10–2.00 mole % of zinc oxide, 0.01–0.30 mole % of manganese dioxide, the specific surface area diameter of barium titanate ranging between 0.2 μm and 1.0 μm.

DETAILED DESCRIPTION OF THE INVENTION

Figure 1:
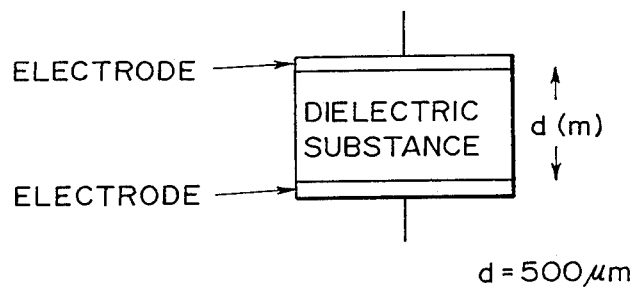
FIG. 1 shows a schematic view of a disk type capacitor.
Figure 2:
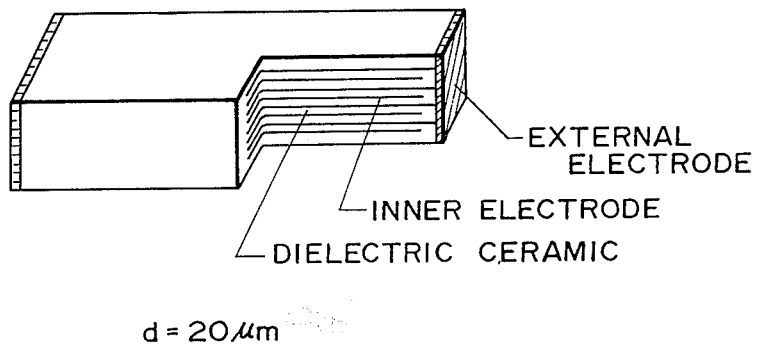
FIG. 2 shows a schematic view of a multilayer ceramic capacitor.

In the composition of the present invention; barium titanate is the principal component; niobium pentoxide has an effect of decreasing the temperature dependency of dielectric constant; zinc oxide serves to further decrease this temperature dependency.

Manganese dioxide serves to retard deterioration of electrical characteristics under such intense electric field conditions as encountered in multilayer capacitors.

According to the present invention, it is possible, by varying proportions of the ingredients and the particle diameter of barium titanate within the ranges defined above, to obtain dielectric ceramics having dielectric constants of 2000–3000, a maximum variation of dielectric constant of ±15% over the temperature range from −55° to +125° C., dissipation factors of up to 0.8%, and high insulation resistance. Especially, the dielectric ceramics of the present inventions are excellent for multilayer ceramic capacitor because the dielectric ceramics deteriorate less even under intense electric field conditions.

The ground for limiting the particle diameter of barium titanate and the content of each ingredient in the present invention is described below.

Hereinafter the diameter of the barium titanate in the present invention is defined by a specific surface area diameter. It is calculated from the equation:

$$S_A = \frac{6}{D_A}$$

where the numeral 6 is a shape factor assuming all the particles being spherical, $S_A$ is a specific surface area (m²/g) measured by BET method developed by Brunauer, Emmett, and Teller[1] and is measured in the present invention, is a true density of barium titanate (g/cm³), and $D_A$ is a specific surface area diameter (μm).

[1] S. Brunauer et al.; J. Am. Chem. Soc. 60 309 (1938)

The specific surface area diameter of not more than 0.2 μm gives a dielectric constant highly dependent on temperature, and said diameter not less than 1.0 μm causes the difficulty in the sintering. Barium titanate in a content of less than 94.70 mole % results in an undesirably low dielectric constant and large temperature-dependency of dielectric constant; when its content exceeds 99.39 mole %, the sintering becomes difficult. Niobium pentoxide content less than 0.5 mole % results in a large dissipation factor and makes the sintering difficult; when its content exceeds 3.00 mole %, the dielectric constant becomes too low and its temperature dependency becomes too large. Zinc oxide in a content of less than 0.10 mole % does not decrease the temperature dependency of dielectric constant; zinc oxide, when exceeding 2.00 mole %, results in a large dissipation factor and deterioration of the insulation resistance. Manganese in a content below 0.01 mole % expressed in terms of $MnO_2$ has no effect and above 0.30 mole %, deteriorates the insulation resistance.

This invention will be illustrated in more detail by the following examples, which are, however, not to be construed to limit the scope of this invention.

EXAMPLE 1

Evaluation using a disk type capacitor

A fine powder of barium titanate was prepared by mixing barium carbonate and titanium oxide in a molar ratio 1:1, and calcining the mixture at 1100° C. It was confirmed by the power X-ray diffraction that the powder had been completely converted into barium titanate. This powder was mixed with niobium pentoxide, zinc oxide, and manganese dioxide in varying ratios so as to give the compositions shown in Table 1 after the firing of the mixtures. These mixtures were dispersed in wet form for 20 hours by using a ball mill made of an engineering plastic in order to prevent the contamination with impurities. The resulting mixtures, after dehydration and drying, were shaped into thin circular pieces of 16 mm in diameter and 0.6 mm in thickness by applying a molding pressure of 3 ton/cm². Samples Nos. 1-18 were obtained by firing these pieces for one hour at the temperatures shown in Table 1.

Both faces of each piece were plated with a silver electrode. The dielectric constant, the dielectric dissipation factor and the variation of dielectric constant were determined on speciments thus prepared by using a YHP digital LCR meter Model 4274A (supplied by YHP, Tokyo, Japan), at a temperature of 25° C., voltage of 1.0 V rms, and frequency of 1.0 KHz. The insulation resistance was determined by using a YHP digital LCR meter Model 4329A (supplied by YHP, Tokyo, Japan), applying a voltage of 100 V for 1 minute. The dielectric constant and the dissipation factor were measured over the range of from −55° to 125° C. Table 1 shows the preparation conditions and the results of the measurement. The percentage change of the dielectric constant is shown relative to the value at 25° C.

The Samples of Nos. 1-10, in Table 1, are included in the scope of this invention and the others are outside the scope. The Samples of Nos. 1-10, being in the scope of this invention, all had dielectric constants exceeding 2000, little temperature dependency of dielectric constants, and low values of dissipation factors.

Figure 4:
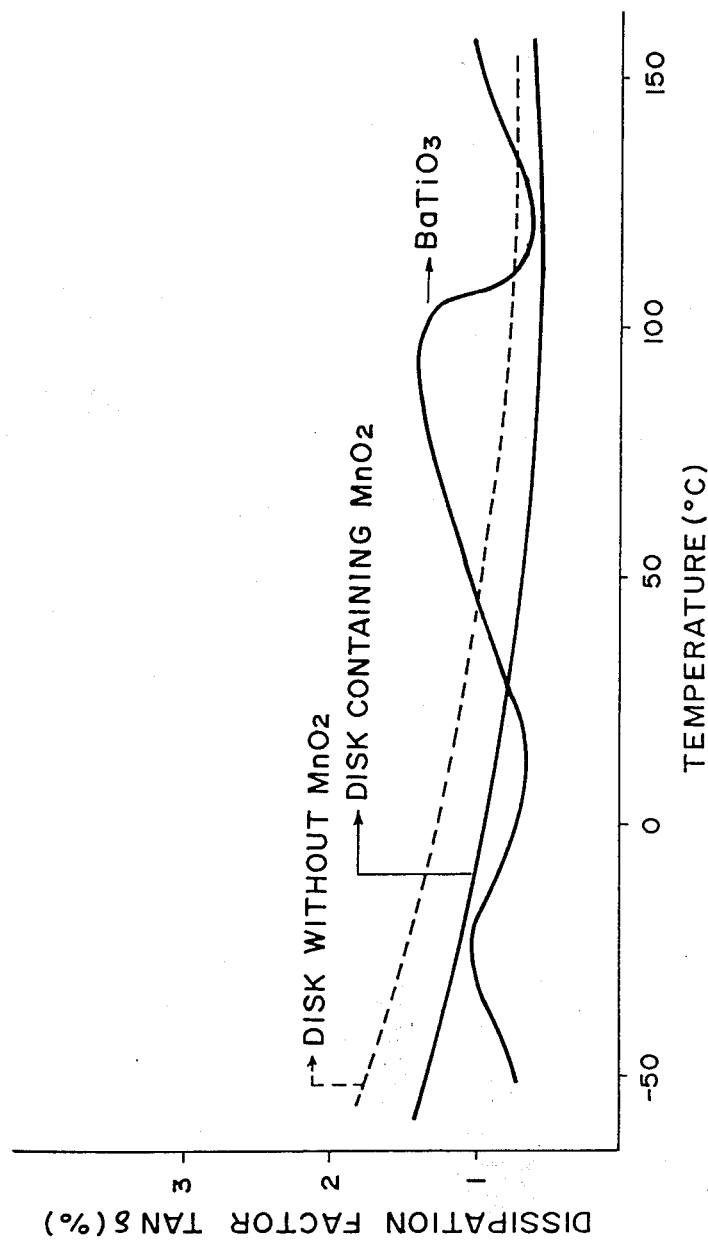
FIG. 4 illustrates the dependence of the dissipation loss on temperature.

FIG. 4 illustrates the temperature dependency of the dissipation factor of Samples of Nos. 5 and 17 employed for disk type capacitors.

The barium titanate employed had a specific surface area diameter of 0.28 μm.

EXAMPLE 2

Evaluation using a multilayer capacitors

Figure 3:
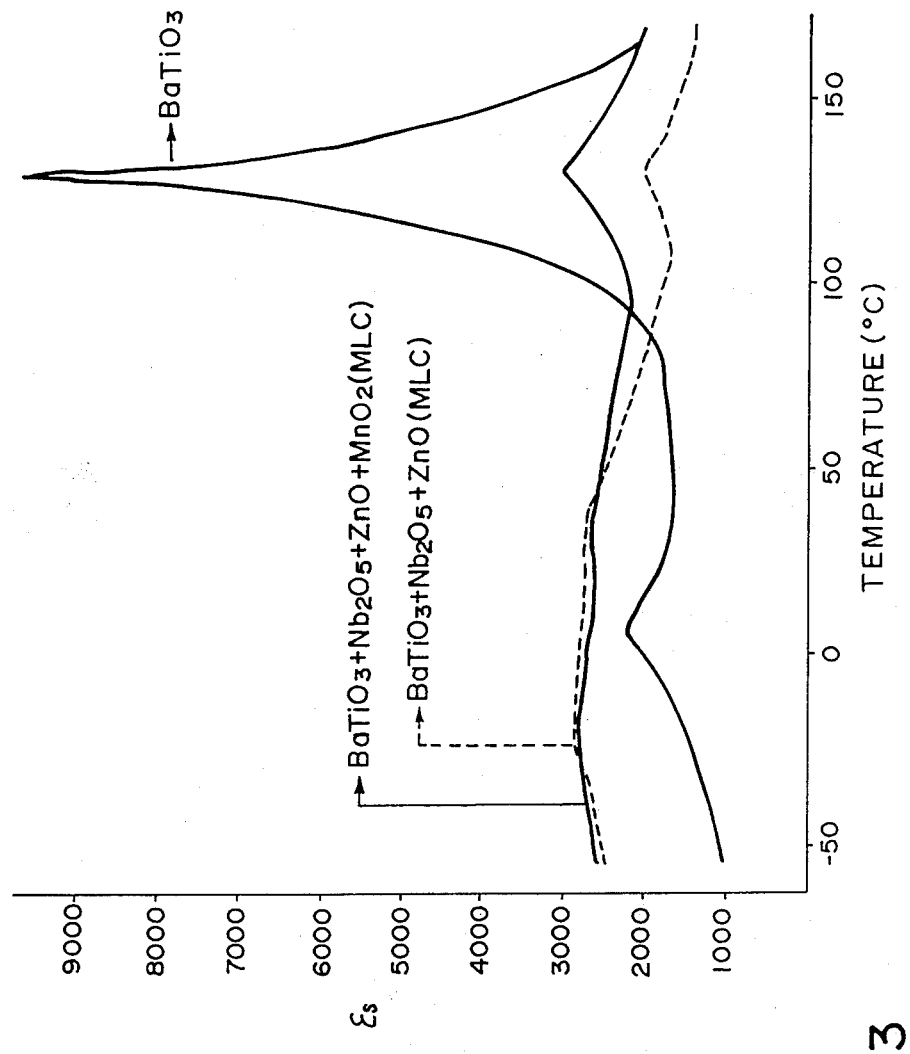
FIG. 3 illustrates the dependence of the dielectric constant on temperature.
Figure 5:
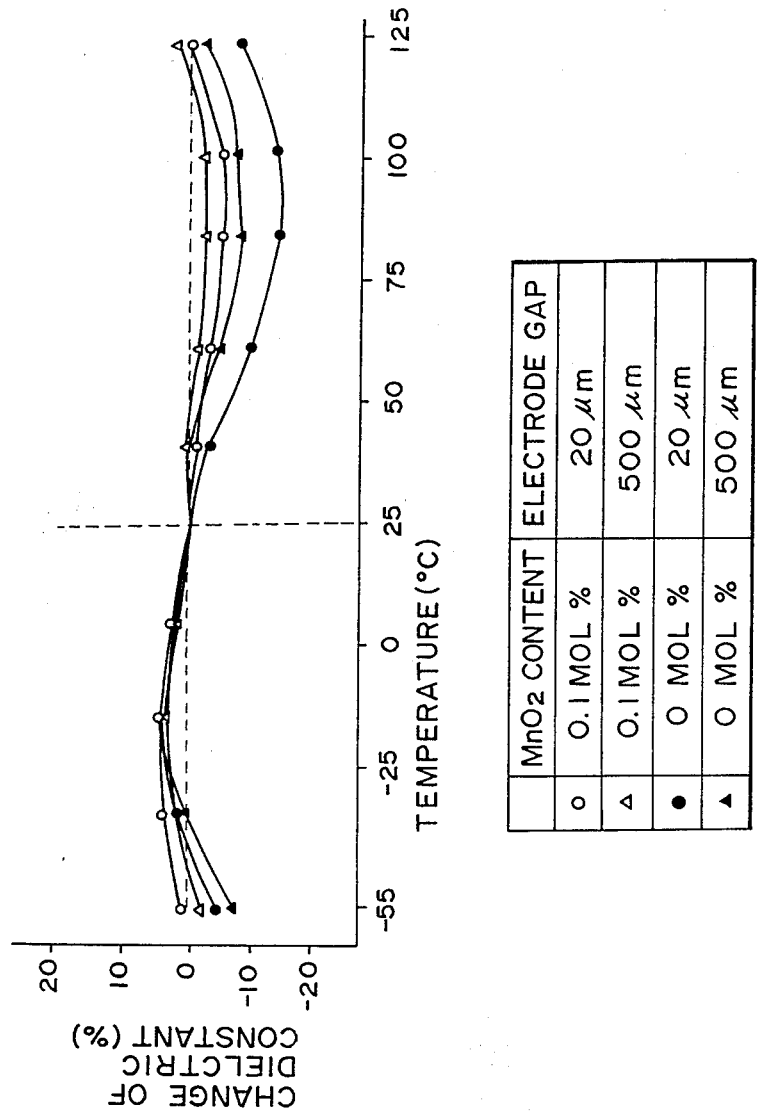
FIG. 5 shows the variation of the dielectric constant ($\epsilon$) with temperature.
Figure 6:
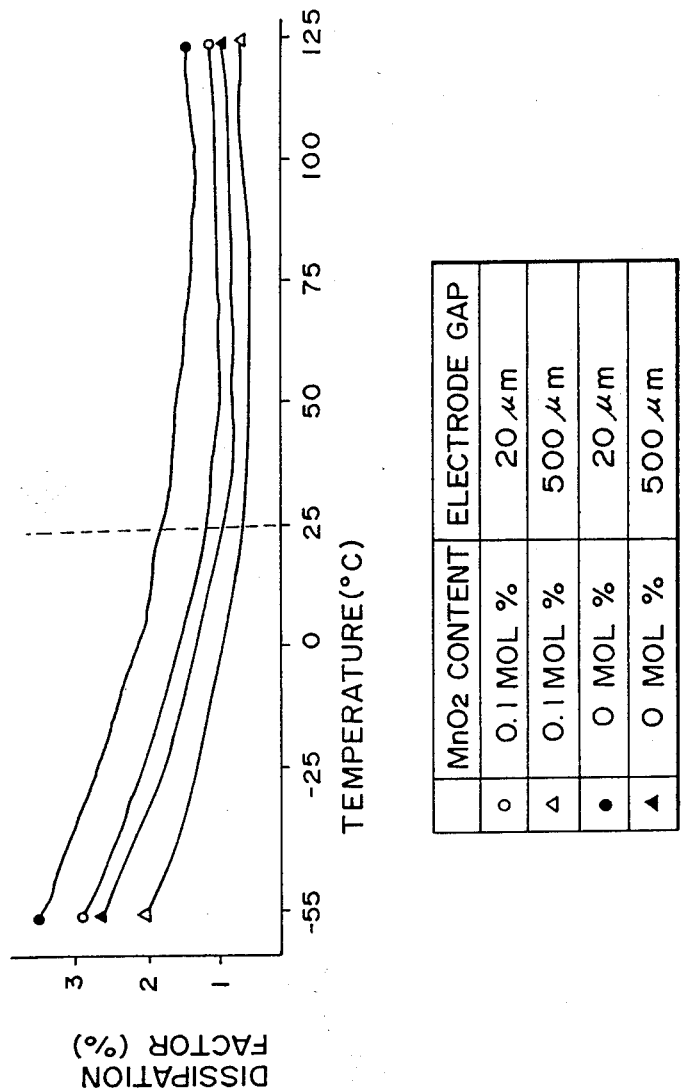
FIG. 6 shows the dependence of the dissipation factor on temperature.

The effect of addition of manganese dioxide was evaluated with the samples of Nos. 1, 2, 4, 5, 7, 8, 16, 17 and 18 which had been prepared in Example 1. The results are shown in Table 2, and FIGS. 5 and 6. The gap between the electrodes of the disk type capacitor was 500 μm, and that of the multilayer capacitor was 20 μm. The stronger the electric field, the more remarkable became the difference of characteristics between capacitors containing and not containing manganese dioxide. Table 2 shows the results, FIG. 3 illustrates the temperature dependency of the dielectric constant, FIG. 5 illustrates the percentage change of the dielectric constant relative to the value at 25° C., and FIG. 6 illustrates the temperature dependency of the dissipation factor, samples of Nos. 5 and 17 being employed in the Figs.

EXAMPLE 3

The influence of particle diameter of barium titanate

The tests were carried out in the same manner as in Example 1 except that barium titanate particles having various diameters were prepared by changing the temperature of calcining the mixtures of barium carbonate and titanium oxide.

The specific surface areas of the barium titanate particles were measured under the conditions below:

Apparatus: MONOSORB (supplied by Quantachrom Co. in U.S.A.)
Principle: BET one-point method
Carrier gas: Helium 70% and nitrogen 30%
Detector: Thermal conductivity bridge type
Gas rate: 15 ml/min.
Sample quantity: not more than 1 g
Evacuation time: 15 min.
Evacuation temperature: 200° C.

Figure 7:
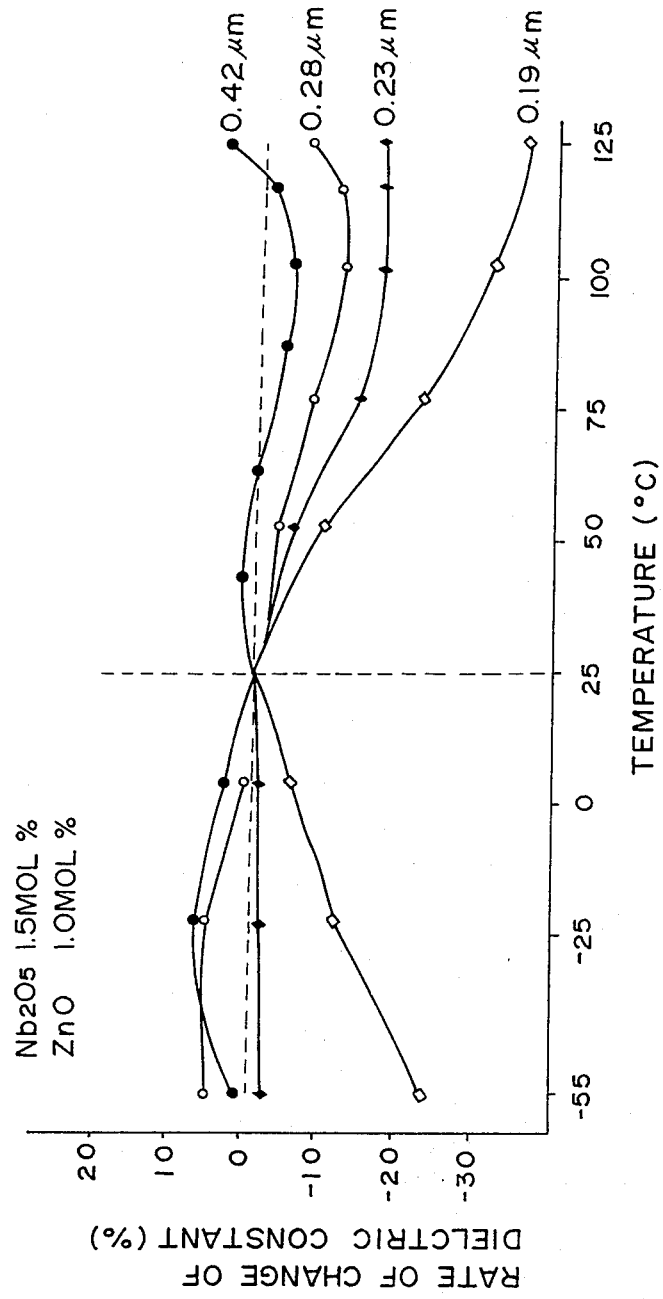
FIG. 7 shows the variation of the dielectric constant ($\epsilon$) with temperature.

Table 3 shows the results of the tests, and FIG. 7 illustrates the temperature dependency of dielectric constants of Sample Nos. 21, 23, 24 and 25. Obviously, the particle diameter highly affects the temperature dependency of the dielectric constant. In the tests, the samples consisted of 97.5 mole % barium titanate, 1.5 mole % niobium pentoxide, 1.0 mole % zinc oxide, and 0.1 mole % manganese dioxide.

As described above, the dielectric ceramic composition of the present invention is most suitable for dielectric material for multilayer ceramic capacitors since the dielectric ceramic compositions included in the scope of the present inventions have practically excellent characteristics such as high dielectric constant, low dielectric dissipation factor, low temperature dependency of dielectric constant, less deterioration of electric characteristics under intense electrical field conditions, and no bismuth compound contained.

TABLE 1

| Sample No. | Ingredient ratios (mol %) BaTiO₃ | Nb₂O₅ | ZnO | MnO₂ | Firing temperature (°C.) | ε 25° C. | tan δ (%) 25° C. | Change (%) of ε at −55° C.~+125° C. Minimum~Maximum | Insulation resistance (Ω) 25° C. |
|---|---|---|---|---|---|---|---|---|---|
| 1 | 98.45 | 1.00 | 0.50 | 0.05 | 1290 | 2700 | 0.72 | −7.0~+1.5 | 1.0 × 10¹² |
| 2 | 98.40 | 1.00 | 0.50 | 0.10 | 1290 | 2660 | 0.67 | −6.5~+1.5 | 1.0 × 10¹² |
| 3 | 97.95 | 1.00 | 1.00 | 0.05 | 1290 | 2670 | 0.71 | −6.4~+1.1 | 1.0 × 10¹² |
| 4 | 97.95 | 1.50 | 0.50 | 0.05 | 1280 | 2530 | 0.70 | −6.8~+1.2 | 1.1 × 10¹² |
| 5 | 97.90 | 1.50 | 0.50 | 0.10 | 1280 | 2500 | 0.65 | −6.5~+1.0 | 1.1 × 10¹² |
| 6 | 97.80 | 1.50 | 0.50 | 0.20 | 1280 | 2440 | 0.55 | −6.0~+1.0 | 6.0 × 10¹¹ |
| 7 | 97.45 | 2.00 | 0.50 | 0.05 | 1270 | 2450 | 0.69 | −9.8~+1.8 | 1.0 × 10¹² |
| 8 | 97.40 | 2.00 | 0.50 | 0.10 | 1270 | 2420 | 0.64 | −9.5~+1.6 | 7.0 × 10¹² |
| 9 | 96.95 | 2.00 | 1.00 | 0.05 | 1270 | 2430 | 0.66 | −9.4~+1.3 | 9.0 × 10¹¹ |
| 10 | 96.95 | 2.50 | 0.50 | 0.05 | 1270 | 2230 | 0.70 | −12.5~+2.1 | 1.0 × 10¹¹ |
| 11 | 95.45 | 4.00 | 0.50 | 0.05 | 1260 | 1800 | 0.72 | −18.0~+6.0 | 8.0 × 10¹¹ |
| 12 | 94.45 | 5.00 | 0.50 | 0.05 | 1250 | 1530 | 0.73 | −24.0~+10.5 | 8.0 × 10¹¹ |
| 13 | 99.05 | 0.40 | 0.50 | 0.05 | * | — | — | — | — |
| 14 | 97.60 | 1.50 | 0.50 | 0.40 | 1270 | 2130 | 0.45 | −5.5~+3.5 | 1.0 × 10¹¹ |
| 15 | 95.45 | 1.50 | 3.00 | 0.05 | 1270 | 2150 | 0.84 | −11.5~+10.7 | 4.0 × 10¹¹ |
| 16 | 98.50 | 1.00 | 0.50 | 0.00 | 1290 | 2710 | 0.93 | −7.3~+5.5 | 7.0 × 10¹¹ |
| 17 | 98.00 | 1.50 | 0.50 | 0.00 | 1280 | 2550 | 0.90 | −7.2~+3.7 | 9.0 × 10¹¹ |
| 18 | 97.50 | 2.00 | 0.50 | 0.00 | 1270 | 2440 | 0.81 | −13.9~+3.3 | 8.0 × 10¹¹ |

*Sintering was not complete.

TABLE 2

| Sample No. | Ingredient ratios (mol %) BaTiO₃ | Nb₂O₅ | ZnO | MnO₂ | Firing temperature (°C.) | Electrode gap (μm) | ε 25° C. | tan δ (%) 25° C. | Change (%) of ε at −55° C.~+125°C. Minimum~Maximum |
|---|---|---|---|---|---|---|---|---|---|
| 16 | 98.50 | 1.00 | 0.50 | 0.00 | 1290 | 500 | 2710 | 0.93 | −7.3~+5.5 |
|  |  |  |  |  |  | 20 | 2650 | 2.74 | −11.5~+5.3 |
| 1 | 98.45 | 1.00 | 0.50 | 0.05 | 1290 | 500 | 2700 | 0.72 | −7.0~+1.5 |
|  |  |  |  |  |  | 20 | 2660 | 0.85 | −8.8~+2.4 |
| 2 | 98.40 | 1.00 | 0.50 | 0.10 | 1290 | 500 | 2660 | 0.67 | −6.5~+1.5 |
|  |  |  |  |  |  | 20 | 2630 | 0.70 | −7.5~+2.2 |
| 17 | 98.00 | 1.50 | 0.50 | 0.00 | 1280 | 500 | 2550 | 0.90 | −7.2~+3.7 |
|  |  |  |  |  |  | 20 | 2540 | 2.15 | −10.3~+3.9 |
| 4 | 97.95 | 1.50 | 0.50 | 0.05 | 1280 | 500 | 2530 | 0.70 | −6.8~+1.2 |
|  |  |  |  |  |  | 20 | 2470 | 0.75 | −7.7~+1.7 |
| 5 | 97.90 | 1.50 | 0.50 | 0.10 | 1280 | 500 | 2500 | 0.65 | −6.5~+1.0 |
|  |  |  |  |  |  | 20 | 2440 | 0.67 | −6.8~+1.5 |
| 18 | 97.50 | 2.00 | 0.50 | 0.00 | 1270 | 500 | 2440 | 0.81 | −13.9~+3.3 |
|  |  |  |  |  |  | 20 | 2390 | 1.95 | −16.8~+3.4 |
| 7 | 97.45 | 2.00 | 0.50 | 0.05 | 1270 | 500 | 2430 | 0.69 | −9.8~+1.8 |
|  |  |  |  |  |  | 20 | 2380 | 0.72 | −10.1~+2.5 |
| 8 | 97.40 | 2.00 | 0.50 | 0.10 | 1270 | 500 | 2420 | 0.64 | −9.5~+1.6 |
|  |  |  |  |  |  | 20 | 2390 | 0.66 | −9.9~+2.7 |

TABLE 3

| Sample No. | Calcining temperature (°C.) | Specific surface area of BaTiO₃ (m²/g) | Specific surface area diameter of BaTiO₃ (μm) | Firing temperature (°C.) | $\epsilon_S$ (25° C.) | tan δ (%) 25° C. | Change (%) of ε at −55° C.~+125° C. Minimum~Maximum |
|---|---|---|---|---|---|---|---|
| 19 | 1200 | 0.83 | 1.20 | * | — | — | — |
| 20 | 1170 | 1.33 | 0.75 | 1350 | 3550 | 0.79 | −6.6~+2.1 |
| 21 | 1130 | 2.38 | 0.42 | 1310 | 3200 | 0.76 | −5.6~+9.2 |
| 22 | 1100 | 2.94 | 0.34 | 1290 | 2920 | 0.72 | −3.4~+6.3 |
| 23 | 1080 | 3.57 | 0.28 | 1280 | 2700 | 0.66 | −12.6~+5.5 |
| 24 | 1030 | 4.35 | 0.23 | 1270 | 2880 | 0.78 | −8.4~+0.0 |
| 25 | 980 | 5.26 | 0.19 | 1270 | 3500 | 1.22 | −35.1~+0.0 |

*Sintering was not complete.

We claim:

1. A multilayer ceramic capacitor comprising a plurality of ceramic layers, a plurality of inner electrodes interposed between said ceramic layers, and outer electrodes on opposing sides of said capacitor for connecting alternate inner electrodes, wherein said ceramic layers consist essentially of 94.70–99.39 mole % of barium titanate, 0.50–3.00 mole % of niobium pentoxide, 0.10–1.00 mole % of zinc oxide, and 0.01–0.30 mole % of manganese dioxide.

2. The multilayer ceramic capacitor according to claim 1, wherein in the ceramic composition, the specific surface area diameter of barium titanate ranges between 0.2 μm and 1.0 μm.

3. A dielectric ceramic composition for multilayer ceramic capacitors consisting essentially of 94.70–99.39 mole % of barium titanate, 0.50–3.00 mole % of niobium pentoxide, 0.10–100 mole % of zinc oxide, and 0.01–0.30 mole % of manganese dioxide.

* * * * *

UNITED STATES PATENT AND TRADEMARK OFFICE
CERTIFICATE OF CORRECTION

PATENT NO. : 4,803,591
DATED : February 7, 1989
INVENTOR(S) : Yasuo MIYASHITA & Masao KASHIMA It is certified that error appears in the above-identified patent and that said Letters Patent is hereby corrected as shown below:

DETAILED DESCRIPTION OF THE INVENTION

Column 3, line 1 add --$\rho$-- to the formula as shown below:

$$\frac{S_A \quad 6}{\rho D_A}$$

Column 3, line 9, insert --$\rho$-- before "is".

Signed and Sealed this

Sixteenth Day of January, 1990

Attest:

JEFFREY M. SAMUELS

Attesting Officer    Acting Commissioner of Patents and Trademarks